(12) United States Patent
Galetti et al.

(10) Patent No.: US 10,367,339 B2
(45) Date of Patent: Jul. 30, 2019

(54) SNAG MITIGATING CABLE TRACK APPARATUS

(71) Applicant: The Boeing Company, Chicago, IL (US)

(72) Inventors: Ralph R. Galetti, Albuquerque, NM (US); Anthony A. Lazzaro, Albuquerque, NM (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 15/591,916

(22) Filed: May 10, 2017

(65) Prior Publication Data

US 2018/0331522 A1 Nov. 15, 2018

(51) Int. Cl.
*H02G 11/00* (2006.01)
*H02G 3/04* (2006.01)
(Continued)

(52) U.S. Cl.
CPC .......... *H02G 3/0406* (2013.01); *F16G 13/16* (2013.01); *F16L 3/015* (2013.01); *H02G 3/0456* (2013.01); *H02G 11/006* (2013.01)

(58) Field of Classification Search
CPC .. H02G 3/0406; H02G 3/0456; H02G 11/006; H02G 11/06; F16L 3/015; F16L 11/18; F16G 13/00; F16G 13/02; F16G 13/04; F16G 13/06; F16G 13/07; F16G 13/08; H01B 7/0823
(Continued)

(56) References Cited

U.S. PATENT DOCUMENTS 3,473,769 A * 10/1969 James ............... F16G 13/16
174/68.3
3,590,854 A * 7/1971 Cork ................ F16G 13/16
137/355.16
(Continued)

FOREIGN PATENT DOCUMENTS

DE  20 2012 104869 UI    4/2013
EP     0456537 A1       11/1991
EP     0693638 A1        1/1996

OTHER PUBLICATIONS

European Search Report for Application No. 18166296.6 dated Oct. 4, 2018, 6 pages.

*Primary Examiner* — Nkeisha Smith
(74) *Attorney, Agent, or Firm* — McDonnell Boehnen Hulbert & Berghoff LLP

(57) ABSTRACT

An example apparatus includes a cable track that includes a first side and a second side that is opposite the first side. The apparatus further includes two or more spacers. The two or more spacers include respective first ends that are attached to the first side of the cable track and respective second ends that are opposite the respective first ends. The two or more spacers further include respective first surfaces between the respective first ends and the respective second ends and respective second surfaces that are opposite the respective first surfaces. The apparatus further includes two or more pins attached proximately to the respective second ends of the two or more spacers. The two or more pins protrude from the respective first surfaces of the two or more spacers and/or protrude from the respective second surfaces of the two or more spacers.

16 Claims, 8 Drawing Sheets

(51) Int. Cl.
*F16G 13/16* (2006.01)
*F16L 3/015* (2006.01)

(58) Field of Classification Search
USPC ............... 248/70, 74.3, 74.4; 138/106, 120; 174/74 A, 69, 72 A; 59/78.1, 900, 78
See application file for complete search history.

(56) References Cited

U.S. PATENT DOCUMENTS

| | | | | |
|---|---|---|---|---|
| 4,597,747 A * | 7/1986 | Lapeyre | ................. | B65G 17/08 198/853 |
| 6,156,974 A * | 12/2000 | Blase | ...................... | F16G 13/16 174/135 |
| 6,311,469 B1 * | 11/2001 | Christmas | ............... | F16G 13/06 474/220 |
| 6,354,070 B1 * | 3/2002 | Blase | ...................... | F16G 13/16 174/135 |
| 6,745,555 B2 * | 6/2004 | Hermey | .................. | F16G 13/16 248/49 |
| 6,864,425 B2 * | 3/2005 | Ikeda | ................... | H02G 11/006 138/120 |
| 7,418,812 B2 * | 9/2008 | Ikeda | ..................... | F16G 13/16 248/49 |
| 7,500,346 B2 * | 3/2009 | Blase | ...................... | F16G 13/16 248/49 |
| 7,520,122 B2 * | 4/2009 | Kitagawa | ................ | F16G 13/16 248/49 |
| 7,600,719 B2 * | 10/2009 | Wehler | ................. | H02G 11/006 248/49 |
| 7,650,743 B2 * | 1/2010 | Wehler | .................... | F16G 13/16 248/49 |
| 7,896,766 B2 * | 3/2011 | Mitzschke | ............ | B65G 17/086 198/850 |
| 7,947,078 B2 * | 5/2011 | Siegal | .................... | A61B 17/68 248/49 |
| 8,950,714 B2 * | 2/2015 | Ikeda | ................... | H02G 11/006 138/106 |
| 2005/0155338 A1 * | 7/2005 | Wehler | .................... | F16G 13/16 59/78.1 |
| 2008/0264032 A1 * | 10/2008 | Kitagawa | ................ | F16G 13/16 59/78.1 |
| 2011/0173946 A1 * | 7/2011 | Yamashita | ............... | F16G 13/16 59/78.1 |
| 2018/0195588 A1 * | 7/2018 | Hogan | ................ | F16H 19/0663 |

* cited by examiner

SNAG MITIGATING CABLE TRACK APPARATUS

FIELD

The present disclosure generally relates to cable tracks, and more specifically to cable tracks with features that can lessen the probability that the cable track snags on itself as one section of the cable track moves over another section.

BACKGROUND

In various applications, it may be necessary to provide an electrical communication or power connection between two machine components, and/or fluid or pneumatic flow between two machine components. Difficulties may arise if at least one of the components is movable during operation of the machine. For example, the two components might move relative to each other such that electrical cables, flexible tubing, or similar means connecting the two components may become pinched, bent, or ruptured. Additionally, such movement may cause damage to electrical cables or flexible tubing as they are dragged over other components of the machine.

Cable tracks are generally designed to facilitate movement of components that are connected via electrical cables or flexible tubing, and to protect such cables or tubing from damage caused by the movement. A cable track typically takes the form of a flexible, elongated plastic or metal linkage having a protective interior region in which the cables and/or tubing can be placed. Springs or other means for storing mechanical energy may be used to help prevent the cable track from snagging on itself as one section of the cable track moves over another. But, such mechanical means may increase the stiffness and internal friction of the cable track, which may limit how quickly the cable track can move and/or increase the amount of energy required to cause movement. Accordingly, the snag-reducing features of some cable tracks may cause some degree of reduced mobility and may require increased energy input for movement.

SUMMARY

In one example, an apparatus for connecting components that move relative to each other is provided. The apparatus includes a cable track that includes a first side and a second side that is opposite the first side. The apparatus further includes two or more spacers. The two or more spacers include respective first ends that are attached to the first side of the cable track and respective second ends that are opposite the respective first ends. The two or more spacers further include respective first surfaces between the respective first ends and the respective second ends and respective second surfaces that are opposite the respective first surfaces. The apparatus further includes two or more pins attached proximately to the respective second ends of the two or more spacers. The two or more pins protrude from the respective first surfaces of the two or more spacers and/or protrude from the respective second surfaces of the two or more spacers.

In another example, an apparatus for connecting components that move relative to each other is provided. The apparatus includes a cable track comprising a first side and a second side that is opposite the first side. The apparatus further includes two or more first spacers. The two or more first spacers include respective first ends that are attached to the first side of the cable track and respective second ends that are opposite the respective first ends. The two or more first spacers further include respective first surfaces between the respective first ends and the respective second ends and respective second surfaces that are opposite the respective first surfaces. The apparatus further includes two or more first pins attached proximately to the respective second ends of the two or more first spacers. The two or more first pins protrude from the respective first surfaces of the two or more first spacers and/or protrude from the respective second surfaces of the two or more first spacers. The apparatus further includes two or more second spacers. The two or more second spacers include respective first ends that are attached to the second side of the cable track and respective second ends that are opposite the respective first ends of the two or more second spacers. The two or more second spacers further include respective first surfaces between the respective first ends of the two or more second spacers and the respective second ends of the two or more second spacers and respective second surfaces that are opposite the respective first surfaces of the two or more second spacers. The apparatus further includes two or more second pins attached proximately to the respective second ends of the two or more second spacers. The two or more second pins protrude from the respective first surfaces of the two or more second spacers and/or protrude from the respective second surfaces of the two or more second spacers.

In yet another example, an apparatus for connecting components that move relative to each other is provided. The apparatus includes a plurality of links forming a cable track that includes a first side and a second side that is opposite the first side. The plurality of links includes respective first sides and respective second sides that are opposite the respective first sides of the plurality of links. The apparatus further includes a plurality of separators. The plurality of separators includes respective spacers attached to the respective first sides of the plurality of links at respective first ends of the respective spacers. The plurality of separators further includes respective pins attached proximately to respective second ends of the respective spacers that are opposite the respective first ends. The plurality of separators are operable to maintain a minimum distance between a first section of the first side of the cable track and a second section of the first side of the cable track as the cable track is flexed such that the first section faces the second section.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying Figures.

DETAILED DESCRIPTION

A cable management device having the cable track(s) (e.g., flexible cable tracks) described herein can protect cables or flexible tubing and facilitate movement of the cable track over itself with less mechanical complexity and with less required input energy. An example cable track has a first side and a second side that is opposite the first side. Electrical cables and/or flexible tubing may be routed through an interior region formed between the first and second sides of the cable track. The electrical cables or flexible tubing may be connected to a first component at a first end and to a second component at a second end. During operation of a system (e.g., a machine), the first component may move relative to the second component (or vice versa). As such, the cable track may provide protection for the cables or flexible tubing as the first and second components move relative to each other.

The cable management device includes additional features that may reduce the probability that one section of the cable track will snag against a second section of the cable track as the first and second sections move over each other. For example, the cable management device further includes two or more spacers having respective first ends that are attached to the first side of the cable track and respective second ends that are opposite the respective first ends. The two or more spacers further include respective first surfaces between the respective first ends and the respective second ends and respective second surfaces that are opposite the respective first surfaces. In some examples, the two or more spacers resemble flat "teeth" or plate-like structures that slightly overlap each other along a longitudinal axis of the cable track. The two or more spacers may also be staggered (e.g., periodically) with respect to the longitudinal axis.

The cable management device further includes two or more pins attached proximately to the respective second ends of the two or more spacers. The two or more pins protrude from the respective first surfaces of the two or more spacers and/or protrude from the respective second surfaces of the two or more spacers. When the cable track is flexed so that a first section is on top of a second section, spacers of the first section will generally impact the pins attached to spacers of the second section. This may help maintain a minimum distance between the first and second sections to prevent the first and second sections from snagging on each other during movement. In some examples, the spacers and pins may be coated with or otherwise include friction reducing materials. Using spacers and pins in this manner may prevent the cable track from snagging on itself during movement, without significantly increasing friction within the cable track or increasing levels of energy required to move one section of the cable track relative to another.

Figure 1:
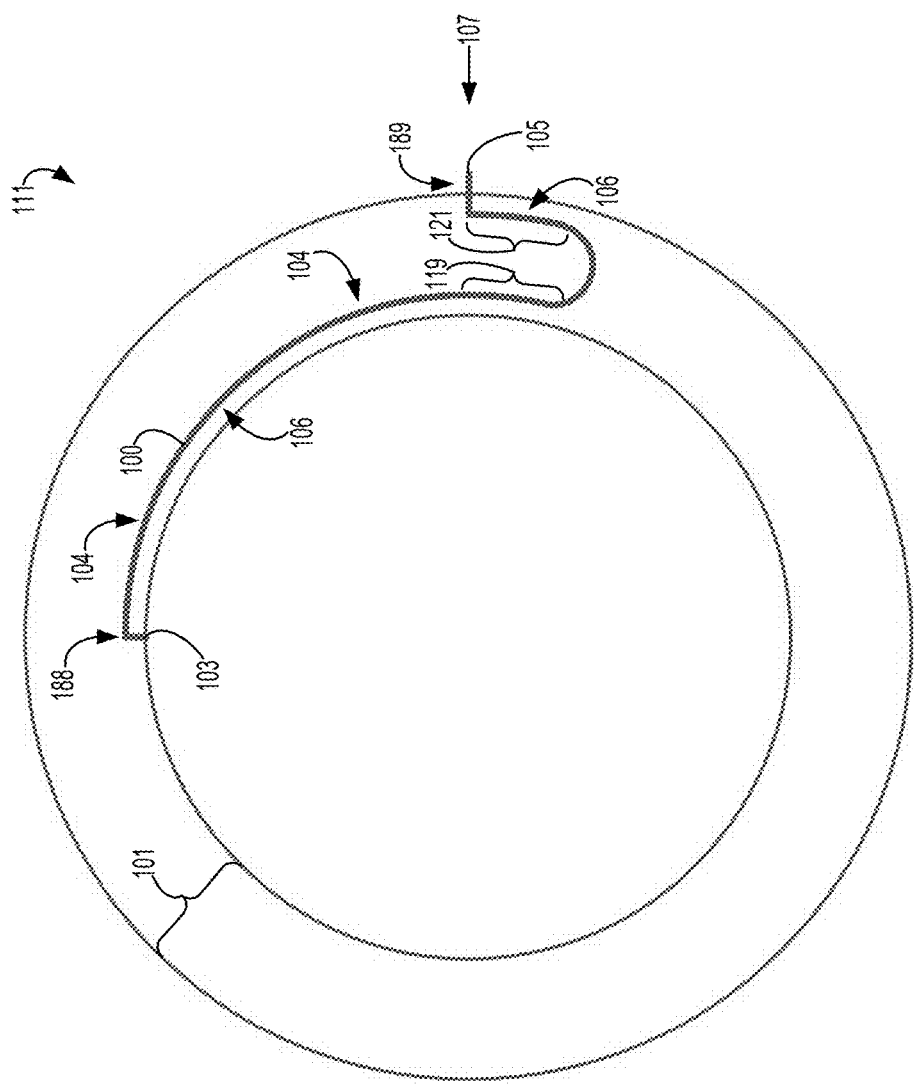
FIG. 1 is a front view of a system, according to an example embodiment.
Figure 2:
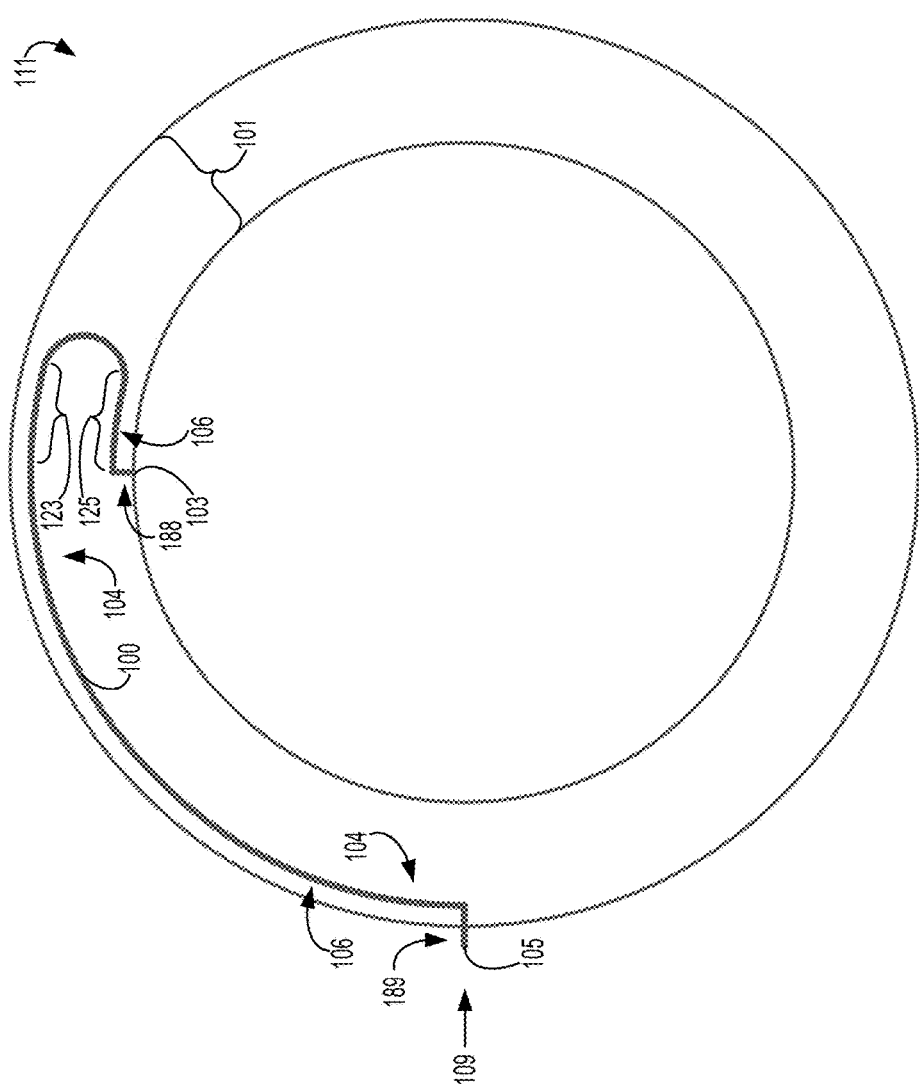
FIG. 2 is a front view of the system of FIG. 1 in a different operating position.

FIGS. 1 and 2 are front views of an example system 111, such as a machine. The system 111 includes a first component 103, a second component 105, and an apparatus 100 (also referred to herein as a "cable management device") for connecting the components 103 and 105 to each other. For example, the apparatus 100 connects to the first component 103 and the second component 105 of the system 111. An enclosure 101 is defined between the first component 103 and the second component 105, and the apparatus 100 is positioned in the enclosure 101. FIGS. 1 and 2 show a cross-section of the enclosure 101, which takes the form of a spherical or a cylindrical shell, but the enclosure 101 can have any suitable cross-sectional shape and the apparatus 100 is configured to move within enclosures having any suitable shape.

The system 111 includes the first component 103 and the second component 105 that move relative to each other during operation of the system 111. A first end 188 of the apparatus 100 is coupled to the first component 103, and a second end 189 of the apparatus 100 is coupled to the second component 105. The ends 188 and 189 of the apparatus 100 can be coupled to the respective component 103 or 105 via, for example, an electrical cable, conduit, and/or flexible tubing. Preferably, the apparatus 100 is a separate component that is positioned in the enclosure 101 and coupled to the first component 103 and the second component 105.

Electrical cables, conduits, and/or flexible tubing connecting the first component 103 to the second component 105 may be routed through the apparatus 100. The first component 103 may be an electrical power source and the second component 105 may be an optical sensor, for example, and electrical cables routed within the apparatus 100 may carry electrical current flowing between the first component 103 and the second component 105. In another example, the first component 103 is a processor, and electrical cables or fiber optic cables routed within the apparatus 100 may transmit optical data collected by the second component 105 to the first component 103. In yet another example, the first component 103 is an outlet for pressurized air or another pressurized fluid and the second component 105 may be powered pneumatically via flexible tubing routed within the apparatus 100. FIG. 1 depicts the second component 105 in a position 107 along the enclosure that is ninety degrees clockwise with respect to the first component 103. As shown, a first section 119 of a first side 104 of the apparatus 100 faces a second section 121 of the first side 104 due to flexing of the apparatus 100.

FIG. 2 is a front view of the system 111 in a different operating condition within the enclosure 101. FIG. 2 depicts the second component 105 in a position 109 along the enclosure 101 that is ninety degrees counter-clockwise with respect to the first component 103. In FIG. 2, a third section 123 of the first side 104 faces a fourth section 125 of the first side 104 due to the flexing of the apparatus 100 at a position that differs from the position at which the apparatus 100 is flexed in FIG. 1. The apparatus 100 is configured to facilitate movement of the second component 105 between the positional extremes shown respectively in FIGS. 1 and 2. In other examples, the apparatus 100 may facilitate 360-degree movement of the second component 105. In yet other examples, the apparatus 100 may facilitate movement of the second component 105 in directions that correspond to any number of possible shapes of the enclosure 101. Other examples are possible as well.

Figure 3:
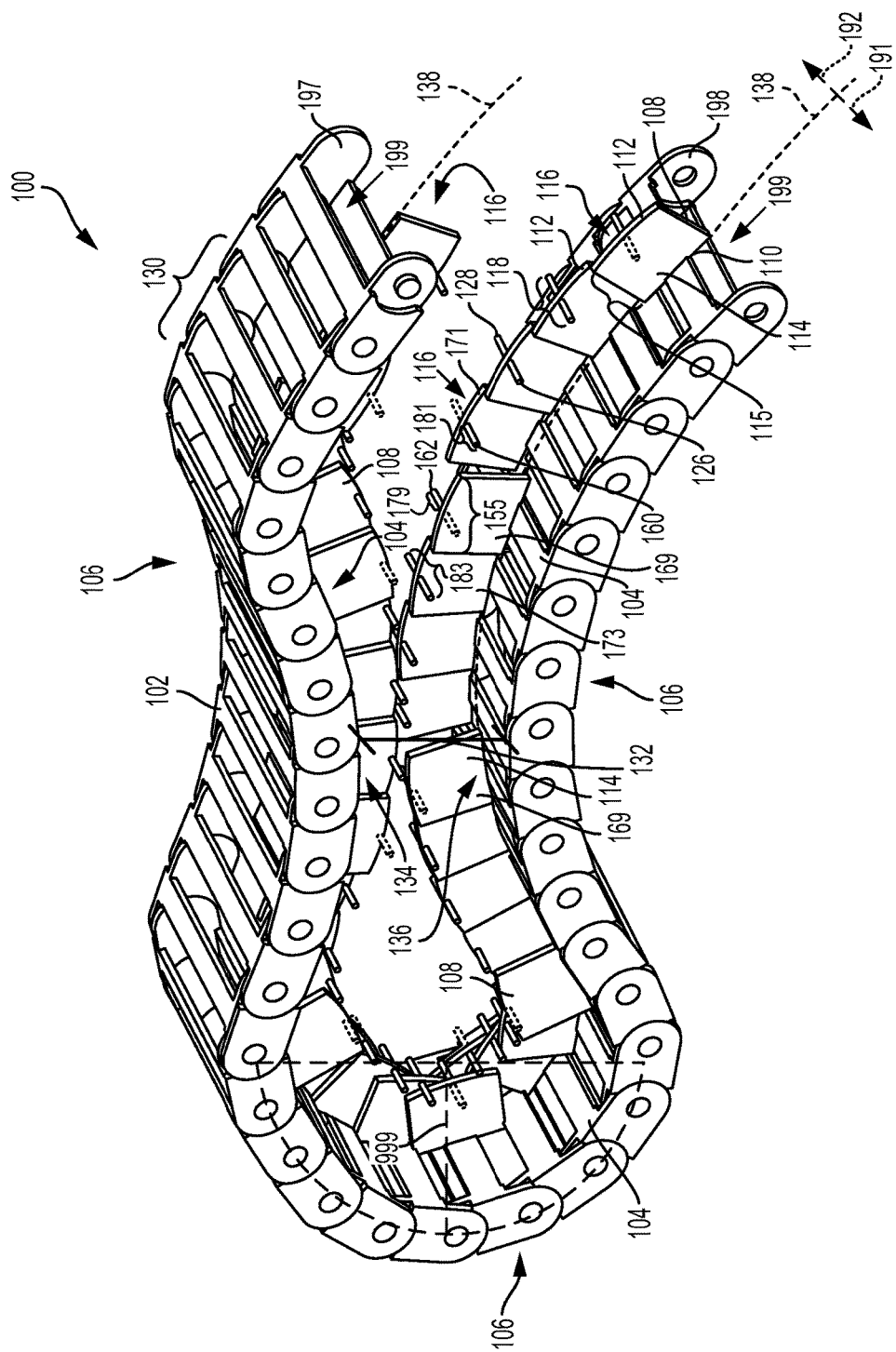
FIG. 3 is a perspective front view of an apparatus for use with the system shown in FIGS. 1 and 2.

FIG. 3 is a perspective front view of the apparatus 100. The apparatus 100 includes a cable track 102 having the first side 104 and a second side 106 that is opposite the first side 104. The apparatus 100 further includes two or more spacers 108. The two or more spacers 108 include respective first ends 110 that are attached to the first side 104 of the cable track 102 and respective second ends 112 that are opposite the respective first ends 110. The two or more spacers 108 also include respective first surfaces 114 between the respective first ends 110 and the respective second ends 112 and respective second surfaces 116 that are opposite the respective first surfaces 114. The apparatus 100 further includes two or more pins 118 attached proximately to the respective second ends 112 of the two or more spacers 108. The two or more pins 118 protrude from the respective first surfaces 114 of the two or more spacers 108 and/or protrude from the respective second surfaces 116 of the two or more spacers 108.

The cable track 102 is composed of two or more interconnected links 130 that are made of plastic, carbon fiber, and/or metal, but other examples are possible. The links 130 form a chain structure (e.g., two or more links form a chain structure). The cable track 102 defines a longitudinal axis 138 and an interior region 199. Electrical cables and/or flexible tubing may be routed through the interior region 199, from an end 197 to an end 198 or vice versa. Such electrical cables or flexible tubing may connect the first component 103 to the second component 105.

The two or more spacers 108 may be composed of or be coated by a friction-reducing material. For example, the two or more spacers 108 can be made of or coated by a polytetrafluoroethylene (PTFE) material, such as TEFLON® ("Teflon" is a registered trademark of The Chemours Company of Wilmington, Del., USA.). The two or more spacers 108 resemble flat "teeth" or plate-like structures that slightly overlap each other along the longitudinal axis 138. That is, each spacer 108 of the two or more spacers 108 is overlapped by at least one adjacent spacer 108 of the two or more spacers 108 when viewed from an angle that is perpendicular to the longitudinal axis 138. The two or more spacers 108 are staggered (e.g., arranged periodically) with respect to the longitudinal axis 138. That is, the distance of each spacer 108 from the longitudinal axis 138 is based on a periodic distance sequence with respect to position along the longitudinal axis 138. The first surfaces 114 and the second surfaces 116 of the two or more spacers 108 are parallel to the longitudinal axis 138 of the cable track 102.

Respective distances 115 between the first end 110 and the second end 112 of each spacer of the two or more spacers 108 are less than or equal to a minimum bending radius of the cable track 102. FIG. 3 shows a bending radius 999 as an example. Respective lengths 155 of the two or more spacers 108 parallel to the longitudinal axis 138 are greater than or equal to the respective lengths of the links 130 in the direction of the longitudinal axis 138. Respective lengths 155 of the two or more spacers 108 parallel to the longitudinal axis 138 are less than a minimum bending radius of the cable track 102.

Within examples, the two or more pins 118 are attached proximately to the respective second ends 112 of the two or more spacers 108. In this context, the phrase "attached proximately" indicates that the pins 118 are closer to the second ends 112 than the first ends 110. In other examples, the phrase "attached proximately" indicates that the pins 118 are attached flush with the second ends 112 or at least ten times closer to the ends 112 than to the ends 110, but other examples are possible.

Figure 4:
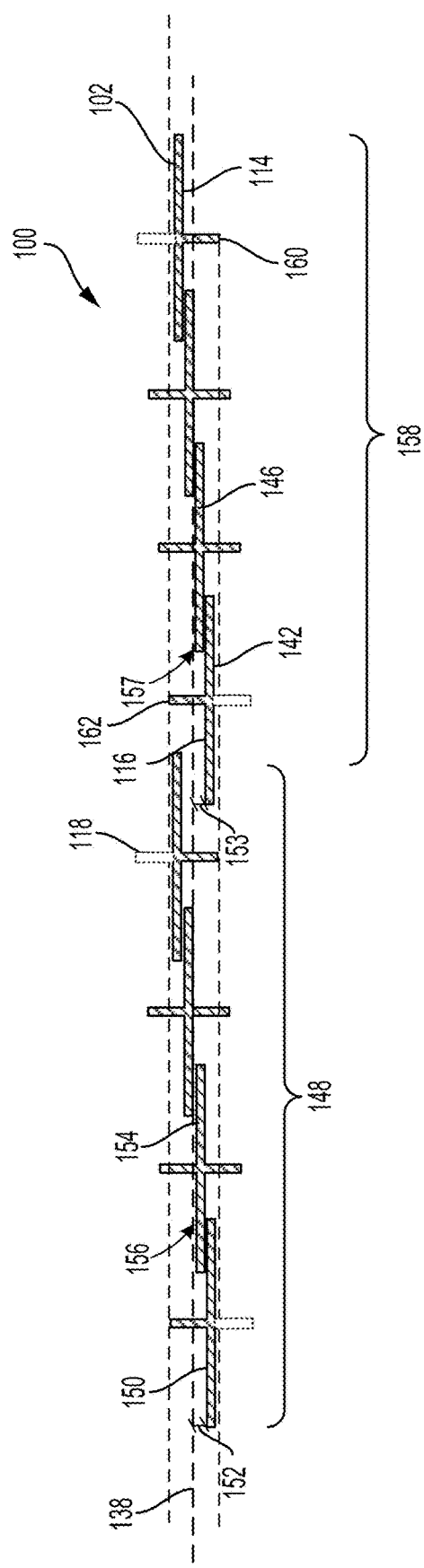
FIG. 4 is a top view of spacers and pins for use with the apparatus shown in FIGS. 1 to 3.

The two or more pins 118 protrude from the respective first surfaces 114 and/or protrude from the respective second surfaces 116 of the two or more spacers 108. For example, a pin 183 attached to a spacer 173 protrudes from both the first surface 114 and the second surface 116 of the spacer 173. The pin 183 extends from each surface 114 and 116 of the spacer 173 because the spacer 173 is displaced a shorter distance from the longitudinal axis 138 in the direction 191 when compared to at least one other spacer 108. A pin 181 attached to a spacer 171 may protrude only from the first surface 114 of the spacer 171 but not from the second surface 116 of the spacer 171. The pin 181 may extend only from one surface 114 because the spacer 171 is displaced from the longitudinal axis 138 in the direction 192 at least as far as any of the other spacers 108. A pin 179 attached to a spacer 169 may protrude only from the second surface 116 of the spacer 169 but not from the first surface 114 of the spacer 169. The pin 179 may extend only from one surface 116 because the spacer 169 is displaced from the longitudinal axis 138 in the direction 191 at least as far as any of the other spacers 108. In FIGS. 3 and 4, various portions of the pins 118 are illustrated with dashed lines, which denotes that those pins are typically omitted from the apparatus 100, but could optionally be included as part of the apparatus 100.

The two or more pins 118 may be composed of or be coated with a friction-reducing material such as a polytetrafluoroethylene (PTFE) material (e.g., a TEFLON® material ("Teflon" is a registered trademark of The Chemours Company of Wilmington, Del., USA.)).

The two or more spacers 108 and the two or more pins 118 are operable to maintain a minimum distance 132 between a first section 134 of the first side 104 of the cable track 102 and a second section 136 of the first side 104 of the cable track 102 as the cable track 102 is flexed such that the first section 134 faces the second section 136. When the cable track 102 is flexed so that the first section 134 overlaps the second section 136, spacers 108 of the first section 134 will generally contact pins 118 attached to the spacers 108 of the second section 136. Additionally or alternatively, spacers 108 of the second section 136 may impact pins 118 attached to spacers 108 of the first section 134.

This arrangement may maintain the minimum distance 132 between the first section 134 and the second section 136 to prevent the first section 134 and the second section 136 from snagging on each other during movement of the apparatus 100. The apparatus 100 may function without significantly increasing friction within the cable track 102 or increasing levels of energy required to move one section of the cable track 102 relative to another.

FIG. 4 is a top view of spacers and pins for use with the apparatus 100 as the two or more spacers 108 and the two or more pins 118. For example, the two or more spacers 108 include at least spacers 150, 154, 142, and 146. The distances of the spacers 150, 154, 142, and 146 from the longitudinal axis 138 are illustrated in FIG. 4. For instance, a distance 153 between the spacer 142 and the longitudinal axis 138 is unequal to a distance 157 between the spacer 146 and the longitudinal axis 138. As shown in FIG. 4, the spacer 142 is adjacent to the spacer 146 and the distance 153 is larger than the distance 157.

Figure 5:
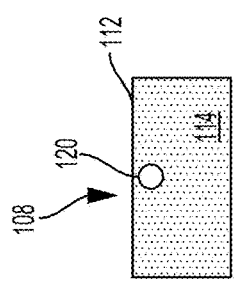
FIG. 5 is a front view of a spacer for use with the apparatus shown in FIGS. 1 to 3.

FIG. 5 is a front view of a spacer 108 for use with the apparatus 100. In the embodiment shown in FIG. 5, the spacer 108 includes a hole 120 proximate to the second end 112 of the spacer 108. The two or more pins 118 may be inserted into the respective holes 120 in the two or more spacers 108 and be secured to the two or more spacers 108 such that the two or more pins 118 protrude from the respective first surfaces 114 and/or the respective second surfaces 116. The two or more pins 118 may include or take the form of one or more rollers that spin freely within the respective holes 120.

Figure 6:
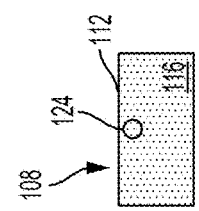
FIG. 6 is a front view and a rear view of an alternative spacer for use with the apparatus shown in FIGS. 1 to 3.
Figure 6:
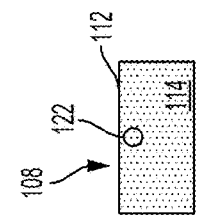

FIG. 6 is a front view and a rear view of an alternative spacer 108 for use with the apparatus 100. The spacer 108 shown in FIG. 6 is similar to the spacer 108 shown in FIG. 5, except that in FIG. 6 the spacer 108 includes a notch 122 and/or a notch 124 instead of a hole 120. In FIG. 6, the first surface 114 of the spacer 108 includes a first notch 122 proximate to the second end 112 of the spacer 108. The second surface 116 of the spacer 108 may also include a second notch 124 proximate to the second end 112 of the spacer 108. As shown in FIG. 3, the two or more pins 118 may include respective first sections 126 that are inserted into the first notches 122 and/or respective second sections 128 that are inserted into the second notches 124.

Referring to FIG. 4, the two or more spacers 108 may include a first group 148 of spacers 108 that includes a spacer 150 separated from the longitudinal axis 138 by a first distance 152 and a spacer 154 separated from the longitudinal axis 138 by a second distance 156. The spacer 154 is adjacent to the spacer 150 and the first distance 152 is unequal to the second distance 156 as shown in FIG. 4.

The two or more spacers 108 may also include a second group 158 of spacers 108 that is adjacent to the first group 148 of spacers 108. The second group 158 of spacers 108 includes a spacer 142 separated from the longitudinal axis 138 by a distance 153 that is equal to the first distance 152 and a spacer 146 separated from the longitudinal axis 138 by a distance 157 that is equal to the second distance 156. The spacer 146 is adjacent to the spacer 142.

The two or more pins 118 may include respective first ends 160 that protrude from the respective first surfaces 114 of the two or more spacers 108. The respective first ends 160 may extend further from the longitudinal axis 138 than any of the spacers 108. In addition to or as an alternative to the first ends 160, the pins 118 may also include respective second ends 162 that protrude from the respective second surfaces 116 of the two or more spacers 108. The respective second ends 162 of the pins 118 may extend further from the longitudinal axis 138 than any of the two or more spacers 108.

Figure 7:
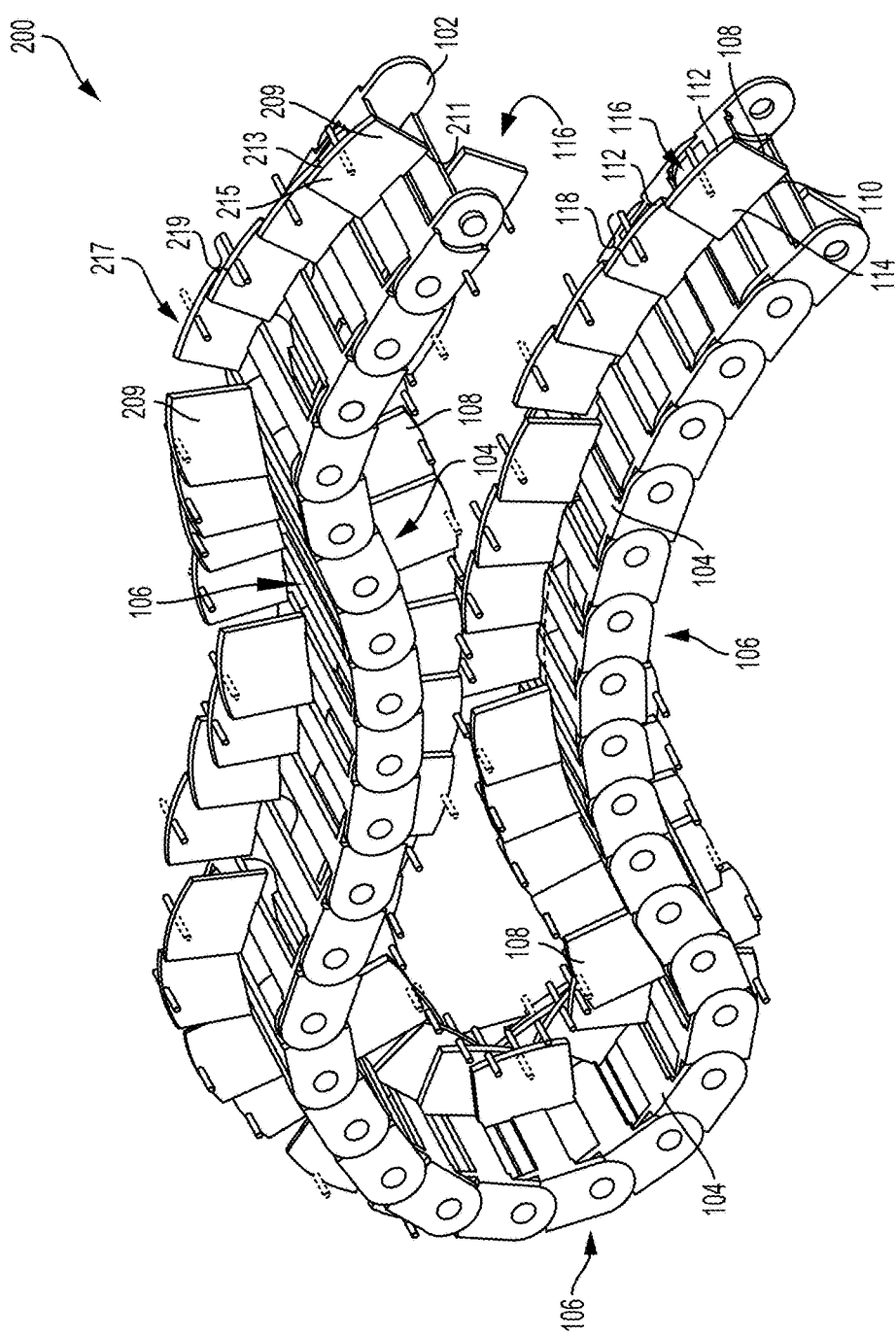
FIG. 7 is a front perspective view of an apparatus for use with the system shown in FIGS. 1 and 2, according to another example embodiment.

FIG. 7 is a front perspective view of an example apparatus 200 (also referred to herein as a "cable management device"). The apparatus 200 includes features similar to the apparatus 100, except apparatus 200 includes spacers 209 coupled to the second side 106 of the cable track 102 in addition to the spacers 108 coupled to the first side 104 of the cable track 102. Components that are common to both apparatus 100 and 200 maintain the reference numbers used above and include the same features described with respect to apparatus 100, unless stated otherwise. More specifically, the apparatus 200 may include any of the features of the apparatus 100 described above, in addition to any other features described herein. Notably, the apparatus 200 differs from the apparatus 100 in that the apparatus 200 includes the two or more second spacers 209 and the two or more second pins 219 on the second side 106 of the cable track 102 in addition to the two or more first spacers 108 and two or more first pins 118 on the first side 104 of the cable track 102. The two or more second spacers 209 and the two or more second pins 219 may function similarly to the two or more first spacers 108 and the two or more first pins 118 when two sections of the second side 106 of the cable track 102 face each other. The two or more second spacers 209 and the two or more second pins 219 may also have structural features that are similar to the two or more first spacers 108 and the two or more first pins 118.

The two or more second spacers 209 are similar to the spacers 108 except the spacers 209 oppose the spacers 108 with respect to the cable track 102. Each spacer 209 includes a first end 211 that is attached to the second side 106 of the cable track 102 and a second end 213 that is opposite the respective first end 211. The spacers 209 also each include a first surface 215 between the respective first end 211 and the respective second end 213 and a second surface 217 that is opposite the respective first surface 215.

The apparatus 200 further includes two or more second pins 219 attached proximately to the respective second ends 213 of the two or more second spacers 209. The two or more second pins 219 protrude from the respective first surfaces 215 of the two or more second spacers 209 and/or protrude from the respective second surfaces 217 of the two or more second spacers 209. The two or more second pins 219 may include any of the features of the two or more first pins 118.

In FIG. 7, various portions of the two or more first pins 118 and the two or more second pins 219 are illustrated with dashed lines, which denotes that those pins are typically omitted, but could optionally be included as part of the apparatus 200.

Figure 8:
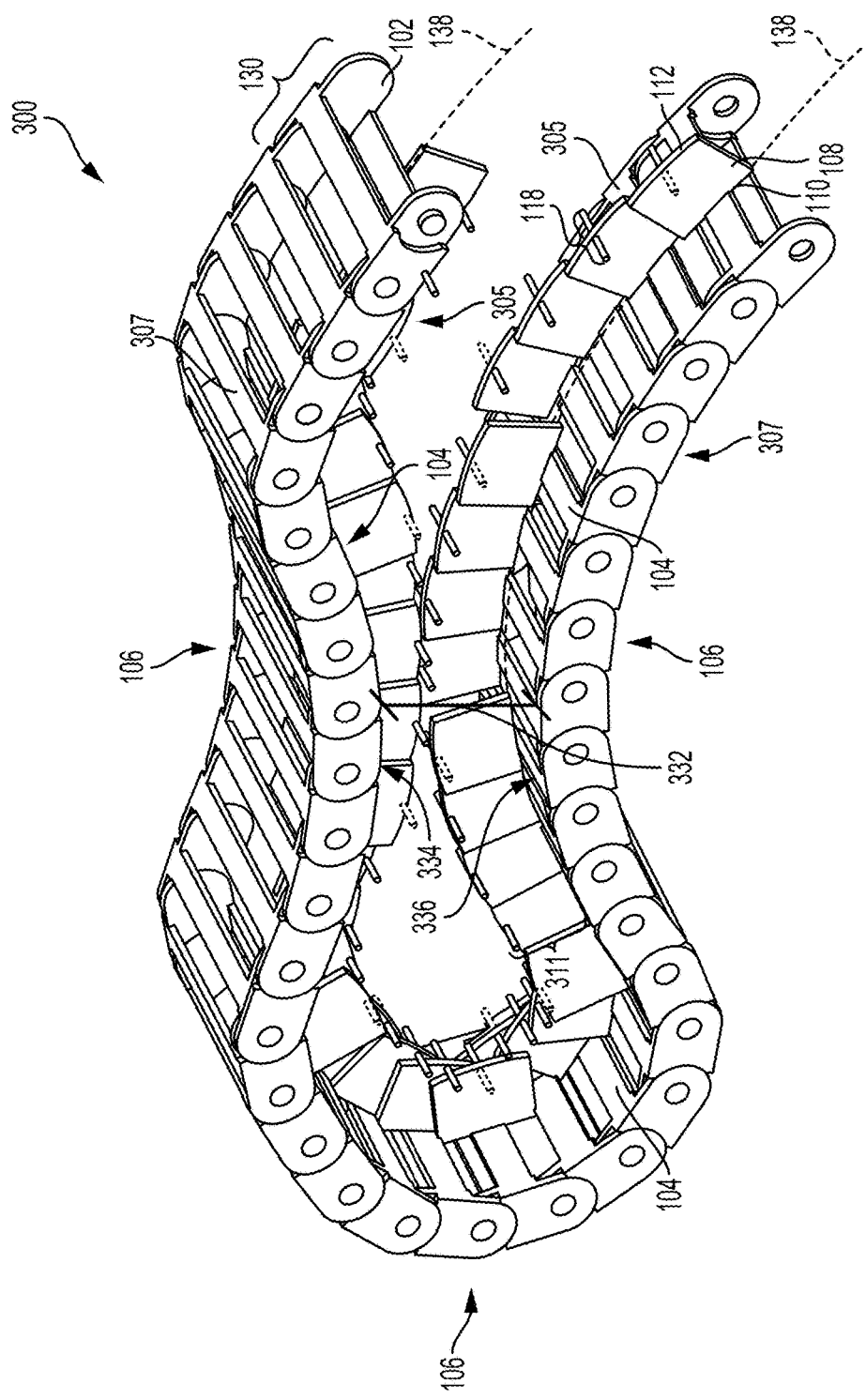
FIG. 8 is a front perspective view of an apparatus for use with the system shown in FIGS. 1 and 2, according to another example embodiment.

FIG. 8 is a front perspective view of an example apparatus 300 (also referred to herein as a "cable management device"). The apparatus 300 may include any of the features of the apparatus 100 or 200 described above, in addition to the features described below. Components of the apparatus 300 that are common to apparatus 100 or 200 maintain the reference numbers used above and include the same features described with respect to apparatus 100 or 200, unless stated otherwise.

The apparatus 300 can be used for connecting components that move relative to each other. The apparatus 300 includes the plurality of links 130 forming the cable track 102. Each of the links 130 includes a first side 305 and a second side 307 that is opposite the first side 305.

The apparatus 300 further includes a plurality of separators 311. Each separator 311 includes a spacer 108 attached to the first side 305 of the respective link 130 at a first end 110 of the spacer 108. Each separator 311 further includes a respective pin 118 attached proximately to the second end 112 of the respective spacer 108. The plurality of separators 311 are operable to maintain a minimum distance 332 between a first section 334 of the first side 104 of the cable track 102 and a second section 336 of the first side 104 of the cable track 102 as the cable track 102 is flexed such that the first section 334 faces the second section 336.

The spacers 108 may be oriented perpendicularly to the respective first sides 305 of the plurality of links 130. The spacers 108 may be oriented parallel to a longitudinal axis 338 of the cable track 102.

The plurality of separators 311 may be operable to prevent the first section 334 of the first side 104 of the cable track 102 from being obstructed by the second section 336 of the first side 104 of the cable track 102 as the first section 334 moves past the second section 336.

Figure 9:
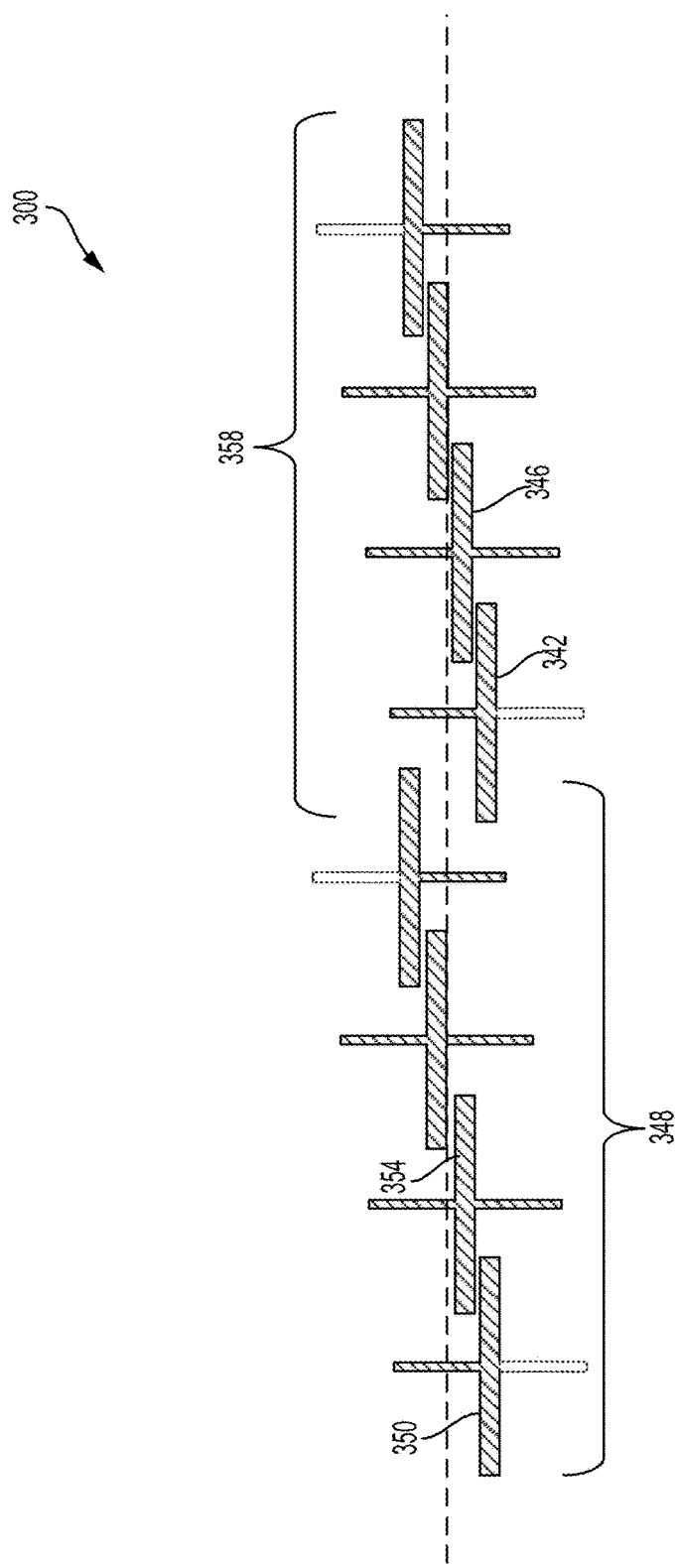
FIG. 9 is a top view of spacers and pins for use with the apparatus shown in FIG. 8.

FIG. 9 is a top view of spacers and pins for use with the apparatus 300. The plurality of separators 311 may include a first group of separators 348 and a second group of separators 358. The first group 348 includes a first separator 350 and a second separator 354 that is adjacent to the first separator 350. The first separator 350 and the second separator 354 are staggered to facilitate the first separator 350 moving past the second separator 354 in response to flexing of the cable track 102. The second group 358 includes a first separator 342 and a second separator 346 that is adjacent to the first separator 342. The first separator 342 and the second separator 346 are staggered to facilitate the first separator 342 moving the past the second separator 346 in response to flexing of the cable track 102.

In FIGS. 7-8, various portions of the pins 118 are illustrated with dashed lines, which denotes that those pins are typically omitted, but could optionally be included as part of the apparatus 300.

Embodiments of the present disclosure can thus relate to one of the enumerated example embodiment (EEEs) listed below.

EEE 1 is an apparatus for connecting components that move relative to each other. The apparatus includes a cable track that includes a first side and a second side that is opposite the first side. The apparatus further includes two or more spacers. The two or more spacers include respective first ends that are attached to the first side of the cable track; respective second ends that are opposite the respective first ends; respective first surfaces between the respective first ends and the respective second ends; and respective second surfaces that are opposite the respective first surfaces. The apparatus further includes two or more pins attached proximately to the respective second ends of the two or more spacers, wherein the two or more pins protrude from the respective first surfaces of the two or more spacers and/or protrude from the respective second surfaces of the two or more spacers.

EEE 2 is the apparatus of EEE 1, wherein the two or more spacers and the two or more pins are operable to maintain a minimum distance between a first section of the first side of the cable track and a second section of the first side of the cable track as the cable track is flexed such that the first section faces the second section.

EEE 3 is the apparatus of EEE 1 or 2, wherein each spacer of the two or more spacers is overlapped by at least one adjacent spacer of the two or more spacers.

EEE 4 is the apparatus of any of EEEs 1-3, wherein the first surfaces and the second surfaces are parallel to a longitudinal axis of the cable track, and wherein a distance between a first spacer of the two or more spacers and the longitudinal axis is unequal to a distance between a second spacer of the two or more spacers and the longitudinal axis.

EEE 5 is the apparatus of EEE 4, wherein the first spacer is adjacent to the second spacer.

EEE 6 is the apparatus of any of EEEs 1-5, wherein respective distances between the first end and the second end of each spacer of the two or more spacers are less than a minimum bending radius of the cable track.

EEE 7 is the apparatus of any of EEEs 1-6, wherein the first surfaces and the second surfaces are parallel to a longitudinal axis of the cable track, and wherein respective lengths of the two or more spacers parallel to the longitudinal axis are less than a minimum bending radius of the cable track.

EEE 8 is the apparatus of any of EEEs 1-7, wherein the two or more spacers further comprise respective holes proximate to the respective second ends of the two or more spacers, and wherein the two or more pins are inserted into the respective holes in the two or more spacers.

EEE 9 is the apparatus of any of EEEs 1-7, wherein the first surfaces of one or more first spacers of the two or more spacers comprise respective first notches proximate to the respective second ends of the one or more first spacers, wherein the second surfaces of one or more second spacers of the two or more spacers comprise respective second notches proximate to the respective second ends of the one or more second spacers, and wherein the two or more pins comprise respective first sections inserted into the respective first notches and/or respective second sections inserted into the respective second notches.

EEE 10 is the apparatus of any of EEEs 1-9, wherein the cable track comprises two or more links that form a chain structure.

EEE 11 is the apparatus of any of EEEs 1-10, wherein the two or more spacers comprise a friction reducing material.

EEE 12 is the apparatus of any of EEEs 1-11, wherein the first surfaces and the second surfaces are parallel to a longitudinal axis of the cable track, wherein the two or more spacers comprise a first group of spacers comprising: a first spacer separated from the longitudinal axis by a first distance; and a second spacer separated from the longitudinal axis by a second distance, wherein the second spacer is adjacent to the first spacer, and wherein the first distance is unequal to the second distance, wherein the two or more spacers comprise a second group of spacers that is adjacent to the first group of spacers, the second group of spacers comprising: a third spacer separated from the longitudinal axis by a distance that is equal to the first distance; and a fourth spacer separated from the longitudinal axis by a distance that is equal to the second distance, wherein the fourth spacer is adjacent to the third spacer.

EEE 13 is the apparatus of any of EEEs 1-12, wherein the first surfaces and the second surfaces are parallel to a longitudinal axis of the cable track, and wherein the two or more pins comprise: respective first ends that protrude from the respective first surfaces of the two or more spacers, wherein the respective first ends of the two or more pins extend further from the longitudinal axis than any of the two or more spacers; and/or respective second ends that protrude from the respective second surfaces of the two or more spacers, wherein the respective second ends of the two or more pins extend further from the longitudinal axis than any of the two or more spacers.

EEE 14 is the apparatus of any of EEEs 1-13, wherein the two or more pins comprise one or more rollers.

EEE 15 is the apparatus of any of EEEs 1-14, wherein the two or more pins comprise a friction reducing material.

EEE 16 is an apparatus for connecting components that move relative to each other, the apparatus comprising: a cable track comprising a first side and a second side that is opposite the first side; two or more first spacers comprising: respective first ends that are attached to the first side of the cable track; respective second ends that are opposite the respective first ends; respective first surfaces between the respective first ends and the respective second ends; and respective second surfaces that are opposite the respective first surfaces. The apparatus further comprises: two or more first pins attached proximately to the respective second ends of the two or more first spacers, wherein the two or more first pins protrude from the respective first surfaces of the two or more first spacers and/or protrude from the respective second surfaces of the two or more first spacers; two or more second spacers comprising: respective first ends that are attached to the second side of the cable track; respective second ends that are opposite the respective first ends of the two or more second spacers; respective first surfaces between the respective first ends of the two or more second spacers and the respective second ends of the two or more second spacers; and respective second surfaces that are opposite the respective first surfaces of the two or more second spacers. The apparatus further comprises two or more second pins attached proximately to the respective second ends of the two or more second spacers, wherein the two or more second pins protrude from the respective first surfaces of the two or more second spacers and/or protrude from the respective second surfaces of the two or more second spacers.

EEE 17 is an apparatus for connecting components that move relative to each other, the apparatus comprising: a plurality of links forming a cable track comprising a first side and a second side that is opposite the first side, wherein the plurality of links comprises respective first sides and respective second sides that are opposite the respective first sides of the plurality of links; and a plurality of separators comprising: respective spacers attached to the respective first sides of the plurality of links at respective first ends of the respective spacers; and respective pins attached proximately to respective second ends of the respective spacers that are opposite the respective first ends, wherein the plurality of separators are operable to maintain a minimum distance between a first section of the first side of the cable track and a second section of the first side of the cable track as the cable track is flexed such that the first section faces the second section.

EEE 18 is the apparatus of EEE 17, wherein the spacers are attached orthogonally to the respective first sides of the plurality of links, and wherein the spacers are oriented parallel to a longitudinal axis of the cable track.

EEE 19 is the apparatus of EEEs 17 or 18, wherein the plurality of separators comprise two or more groups of separators, wherein the two or more groups of separators each comprise a first separator and a second separator that is adjacent to the first separator, and wherein the first separator and the second separator of each group of the two or more groups of separators are staggered to facilitate the first separator moving past the second separator in response to flexing of the cable track.

EEE 20 is the apparatus of any of EEEs 17-19, wherein the plurality of separators are operable to prevent the first section of the first side of the cable track from being obstructed by the second section of the first side of the cable track as the first section moves past the second section.

EEE 21 is the apparatus of any of EEEs 1-15, further comprising two or more second spacers comprising: respective first ends that are attached to the second side of the cable track; respective second ends that are opposite the respective first ends of the two or more second spacers; respective first surfaces between the respective first ends of the two or more second spacers and the respective second ends of the two or more second spacers; and respective second surfaces that are opposite the respective first surfaces of the two or more second spacers; and two or more second pins attached proximately to the respective second ends of the two or more second spacers, wherein the two or more second pins protrude from the respective first surfaces of the two or more second spacers and/or protrude from the respective second surfaces of the two or more second spacers.

Disclosed embodiments will now be described more fully hereinafter with reference to the accompanying Drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. An apparatus for connecting components that move relative to each other, the apparatus comprising:
a cable track comprising a first side and a second side that is opposite the first side;
two or more spacers comprising:
respective first ends that are attached to the first side of the cable track;
respective second ends that are opposite the respective first ends;
respective first surfaces between the respective first ends and the respective second ends; and
respective second surfaces that are opposite the respective first surfaces; and
two or more pins attached proximately to the respective second ends of the two or more spacers, wherein the two or more pins protrude from the respective first surfaces of the two or more spacers and/or protrude from the respective second surfaces of the two or more spacers,
wherein the cable track is configured to flex such that a spacer of the two or more spacers contacts a pin of the two or more pins that is attached to another spacer of the two or more spacers.

2. The apparatus of claim 1, wherein the two or more spacers and the two or more pins are operable to maintain a minimum distance between a first section of the first side of the cable track and a second section of the first side of the cable track as the cable track is flexed such that the first section faces the second section.

3. The apparatus of claim 1,
wherein the first surfaces and the second surfaces are parallel to a longitudinal axis of the cable track, and
wherein a distance between a first spacer of the two or more spacers and the longitudinal axis is unequal to a distance between a second spacer of the two or more spacers and the longitudinal axis.

4. The apparatus of claim 3, wherein the first spacer is adjacent to the second spacer.

5. The apparatus of claim 1, wherein distances between the first end and the second end of each spacer of the two or more spacers are less than a minimum bending radius of the cable track.

6. The apparatus of claim 1,
wherein the first surfaces and the second surfaces are parallel to a longitudinal axis of the cable track, and
wherein lengths of the two or more spacers parallel to the longitudinal axis are less than a minimum bending radius of the cable track.

7. The apparatus of claim 1,
wherein the two or more spacers further comprise respective holes proximate to the respective second ends of the two or more spacers, and
wherein the two or more pins are inserted into the respective holes in the two or more spacers.

8. The apparatus of claim 1, wherein the cable track comprises two or more links that form a chain structure.

9. The apparatus of claim 1, wherein the two or more spacers comprise a friction reducing material.

10. The apparatus of claim 1, wherein the first surfaces and the second surfaces are parallel to a longitudinal axis of the cable track, and wherein the two or more pins comprise:
respective first ends that protrude from the respective first surfaces of the two or more spacers, wherein the respective first ends of the two or more pins extend further from the longitudinal axis than any of the two or more spacers; and/or
respective second ends that protrude from the respective second surfaces of the two or more spacers, wherein the respective second ends of the two or more pins extend further from the longitudinal axis than any of the two or more spacers.

11. The apparatus of claim 1, wherein the two or more pins comprise one or more rollers.

12. The apparatus of claim 1, wherein the two or more pins comprise a friction reducing material.

13. An apparatus for connecting components that move relative to each other, the apparatus comprising:
a cable track comprising a first side and a second side that is opposite the first side;
two or more spacers comprising:
respective first ends that are attached to the first side of the cable track;
respective second ends that are opposite the respective first ends;
respective first surfaces between the respective first ends and the respective second ends; and
respective second surfaces that are opposite the respective first surfaces; and
two or more pins attached proximately to the respective second ends of the two or more spacers, wherein the two or more pins protrude from the respective first surfaces of the two or more spacers and/or protrude from the respective second surfaces of the two or more spacers,
wherein the cable track is configured to flex such that a spacer of the two or more spacers contacts a pin of the two or more pins that is attached to another spacer of the two or more spacers,
wherein each spacer of the two or more spacers is overlapped by at least one adjacent spacer of the two or more spacers.

14. An apparatus for connecting components that move relative to each other, the apparatus comprising:
a cable track comprising a first side and a second side that is opposite the first side;
two or more spacers comprising:
respective first ends that are attached to the first side of the cable track;
respective second ends that are opposite the respective first ends;
respective first surfaces between the respective first ends and the respective second ends; and
respective second surfaces that are opposite the respective first surfaces; and
two or more pins attached proximately to the respective second ends of the two or more spacers, wherein the two or more pins protrude from the respective first surfaces of the two or more spacers and/or protrude from the respective second surfaces of the two or more spacers,
wherein the cable track is configured to flex such that a spacer of the two or more spacers contacts a pin of the two or more pins that is attached to another spacer of the two or more spacers,
wherein the first surfaces of one or more first spacers of the two or more spacers comprise respective first notches proximate to the respective second ends of the one or more first spacers,
wherein the second surfaces of one or more second spacers of the two or more spacers comprise respective second notches proximate to the respective second ends of the one or more second spacers, and
wherein the two or more pins comprise respective first sections inserted into the respective first notches and/or respective second sections inserted into the respective second notches.

15. An apparatus for connecting components that move relative to each other, the apparatus comprising:
a cable track comprising a first side and a second side that is opposite the first side;
two or more spacers comprising:
respective first ends that are attached to the first side of the cable track;
respective second ends that are opposite the respective first ends;
respective first surfaces between the respective first ends and the respective second ends; and
respective second surfaces that are opposite the respective first surfaces; and
two or more pins attached proximately to the respective second ends of the two or more spacers, wherein the two or more pins protrude from the respective first surfaces of the two or more spacers and/or protrude from the respective second surfaces of the two or more spacers,
wherein the cable track is configured to flex such that a spacer of the two or more spacers contacts a pin of the two or more pins that is attached to another spacer of the two or more spacers,
wherein the first surfaces and the second surfaces are parallel to a longitudinal axis of the cable track,
wherein the two or more spacers comprise a first group of spacers comprising:
a first spacer separated from the longitudinal axis by a first distance; and
a second spacer separated from the longitudinal axis by a second distance,
wherein the second spacer is adjacent to the first spacer, and wherein the first distance is unequal to the second distance,
wherein the two or more spacers comprise a second group of spacers that is adjacent to the first group of spacers, the second group of spacers comprising:
a third spacer separated from the longitudinal axis by a distance that is equal to the first distance; and
a fourth spacer separated from the longitudinal axis by a distance that is equal to the second distance, wherein the fourth spacer is adjacent to the third spacer.

16. An apparatus for connecting components that move relative to each other, the apparatus comprising:

a cable track comprising a first side and a second side that is opposite the first side;
two or more first spacers comprising:
respective first ends that are attached to the first side of the cable track;
respective second ends that are opposite the respective first ends;
respective first surfaces between the respective first ends and the respective second ends; and
respective second surfaces that are opposite the respective first surfaces;
two or more first pins attached proximately to the respective second ends of the two or more first spacers, wherein the two or more first pins protrude from the respective first surfaces of the two or more first spacers and/or protrude from the respective second surfaces of the two or more first spacers;
wherein the cable track is configured to flex such that a spacer of the two or more first spacers contacts a pin of the two or more first pins that is attached to another spacer of the two or more first spacers, two or more second spacers comprising:
respective first ends that are attached to the second side of the cable track;
respective second ends that are opposite the respective first ends of the two or more second spacers;
respective first surfaces between the respective first ends of the two or more second spacers and the respective second ends of the two or more second spacers; and
respective second surfaces that are opposite the respective first surfaces of the two or more second spacers; and
two or more second pins attached proximately to the respective second ends of the two or more second spacers, wherein the two or more second pins protrude from the respective first surfaces of the two or more second spacers and/or protrude from the respective second surfaces of the two or more second spacers.

* * * * *